United States Patent [19]
Moklebust, deceased

[11] 3,765,868

[45] Oct. 16, 1973

[54] METHOD FOR THE SELECTIVE RECOVERY OF METALLIC IRON AND TITANIUM OXIDE VALUES FROM ILMENITES

[75] Inventor: Olav Moklebust, deceased, late of Kendall Park, N.J. by Gudrun Moklebust, executrix

[73] Assignee: N L Industries, Inc., New York, N.Y.

[22] Filed: July 7, 1971

[21] Appl. No.: 160,449

[52] U.S. Cl. .......................... 75/1, 75/10 R, 423/80
[51] Int. Cl. .......................... C01z 23/04, C22b 5/10
[58] Field of Search .................... 75/1, 3, 10, 44 X; 23/202 R; 423/80

[56] References Cited
UNITED STATES PATENTS

| | | | |
|---|---|---|---|
| 2,476,453 | 7/1949 | Pierce et al. | 23/202 R X |
| 2,802,721 | 8/1957 | Cooper | 23/202 R X |
| 3,457,037 | 7/1969 | Arainendia et al. | 23/202 R |
| 3,218,152 | 11/1965 | Sasabe | 75/1 |
| 921,686 | 5/1909 | Fitzgerald et al. | 23/202 R X |
| 1,618,795 | 2/1927 | Bachman | 23/202 R |
| 2,903,341 | 9/1959 | Pike | 23/202 R |
| 2,771,354 | 11/1956 | Moklebust et al. | 75/3 X |
| 2,986,460 | 5/1961 | Babcock et al. | 75/44 X |
| 3,072,474 | 1/1963 | Atkinson et al. | 75/3 X |
| 3,101,267 | 8/1963 | Dunn | 75/10 X |

FOREIGN PATENTS OR APPLICATIONS

| | | | |
|---|---|---|---|
| 391,704 | 10/1940 | Canada | 75/1 |
| 215,866 | 7/1958 | Australia | 75/1 |

*Primary Examiner*—A. B. Curtis
*Attorney*—Robert L. Lehman et al.

[57] ABSTRACT

Metallic iron and titanium oxide values are recovered from ilmenite ores and concentrates in particulate form to the combined operations of solid state reduction and electric arc smelting.

9 Claims, 2 Drawing Figures

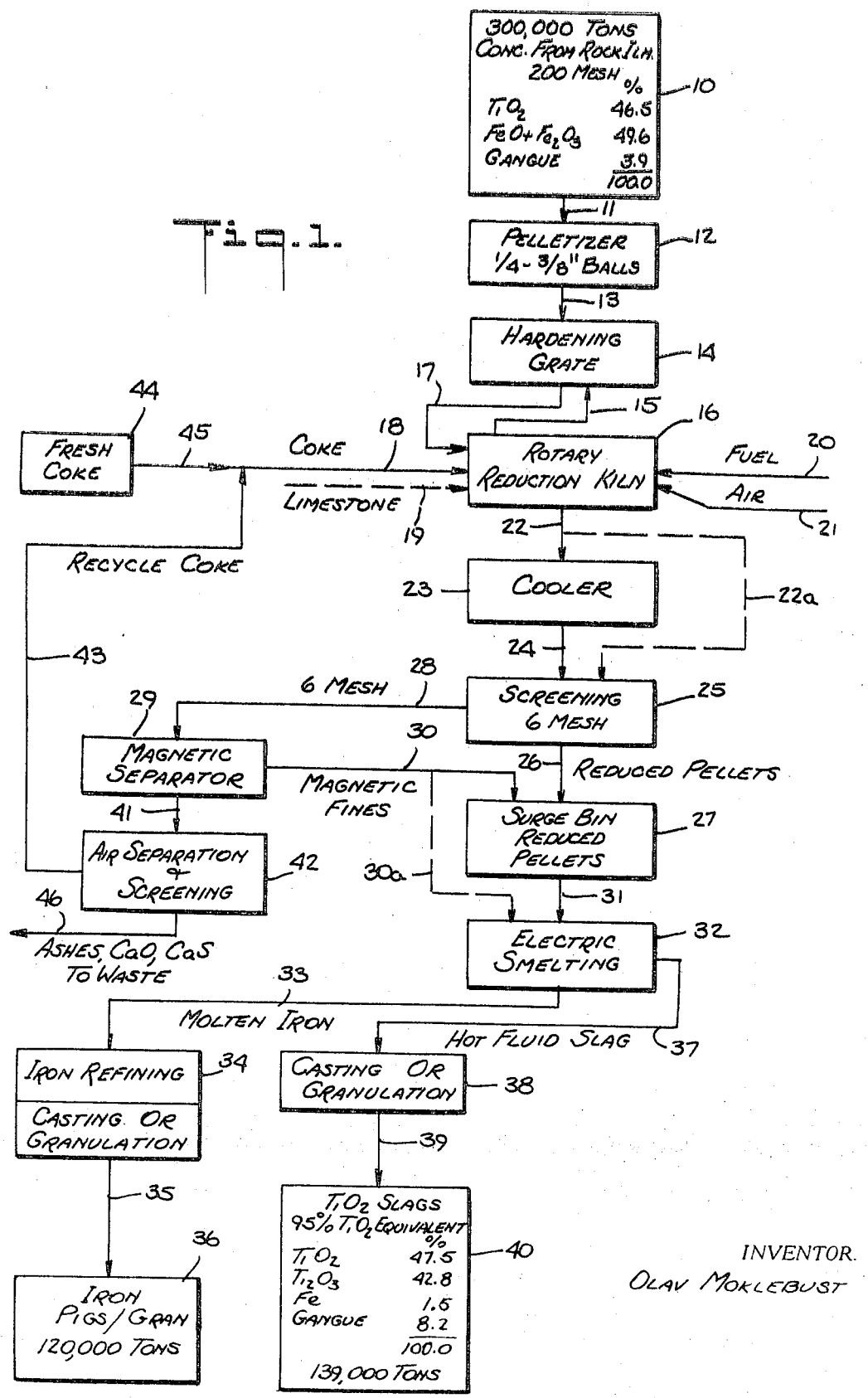

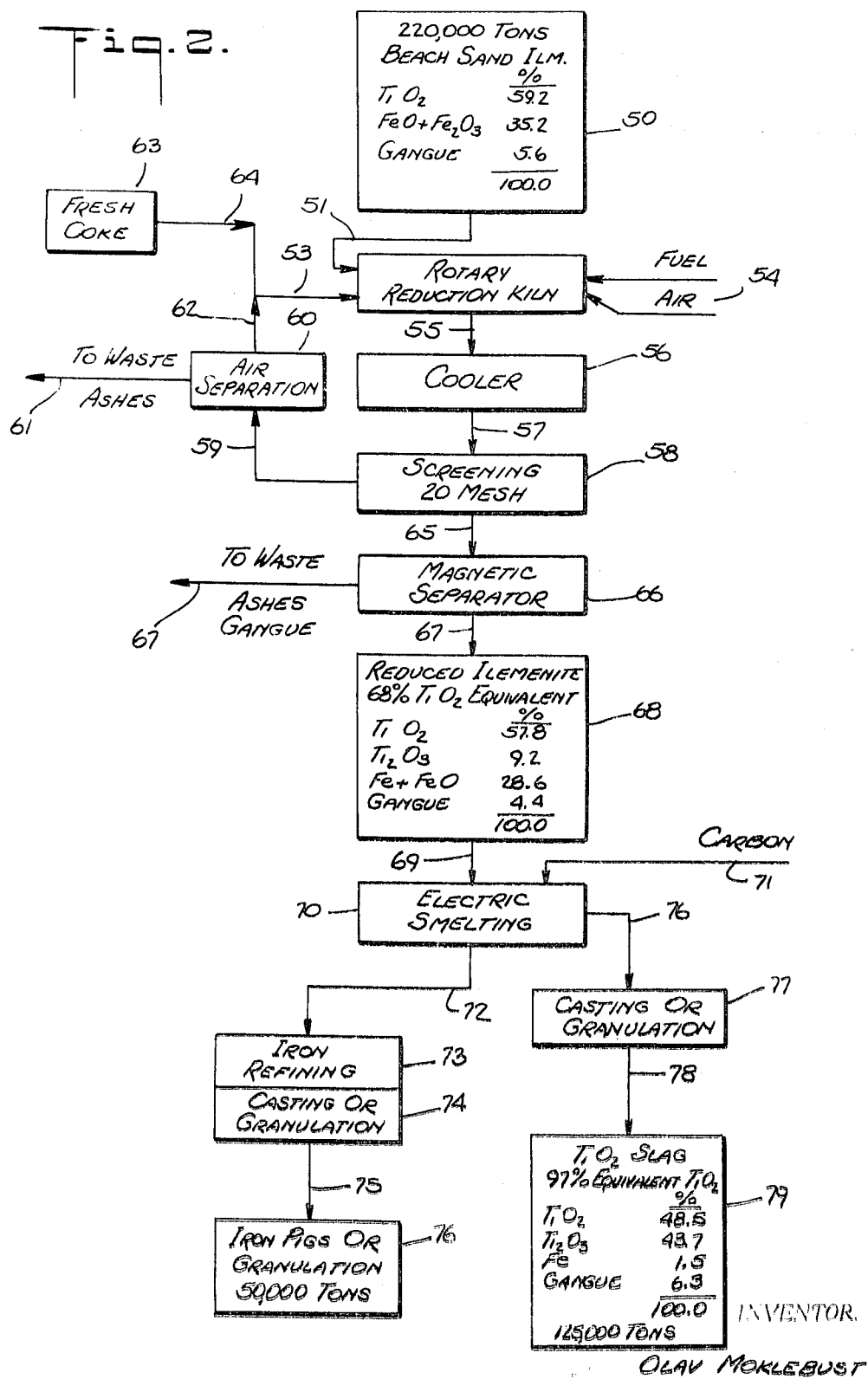

METHOD FOR THE SELECTIVE RECOVERY OF METALLIC IRON AND TITANIUM OXIDE VALUES FROM ILMENITES

This invention pertains to improvements in methods for the selective recovery of metallic iron and titanium oxide values, and more specifically titanium dioxide values, from ilmenite containing raw materials, such as ilmenite ores and concentrates.

A primary object of the invention is to provide an efficient and economical process for the selective recovery of metallic iron and titanium oxide values in high yields from the lower grades of titanium ores, such as rock and beach sand ilmenites, the titanium oxides being recovered in the form of a slag containing 75 to 100 percent by weight of titanium oxide, calculated as $TiO_2$, hereinafter referred to as the titanium dioxide equivalent thereof.

Titanium dioxide, $TiO_2$, is of importance industrially for the production of $TiO_2$ pigments and titanium metal. The raw materials for these industries are $TiO_2$ and iron oxide containing ilmenite ores, containing about 45–65% $TiO_2$, electric furnace slags containing about 70% $TiO_2$ and rutiles containing about 96% $TiO_2$. The ilmenites are the most abundant.

For the production of $TiO_2$ pigments, two different processes are used today — the sulfate process, whereby the ilmenites or slags are digested in sulfuric acid, and the chloride process, whereby the ore is chlorinated. The raw materials for the sulfate process are usually ilmenites or slags whereas rutiles have been preferred for chlorination.

Both processes prefer feed materials with high $TiO_2$ content because this reduces the quantities of waste products for disposal, and minimizes the air and water pollution. Besides, as the supply of rutile is relatively scarce, it appears that lower grade raw materials, i.e., ilmenites with 45–65% $TiO_2$ will be the future basis for $TiO_2$ raw materials.

Direct smelting of concentrates from solid rock ilmenites in electric furnaces is now carried out industrially giving $TiO_2$ slag products with about 70% $TiO_2$ equivalent, and fluid iron which is refined and sold as a by-product. A serious object to this process is that all of the ashes from the reductant (coke) as well as gangue and other contaminants in the ore go into the slag and thus contaminate and depress the $TiO_2$ content.

It has also been proposed to smelt such ores or concentrates with additions of slag forming agents such as lime, dolomite, calcium carbonate, etc., which, however, contaminate the slag and reduce the $TiO_2$ content. It has further been proposed to subject such ores to solid state reduction followed by acid extraction of the iron values or followed by fine grinding and magnetic separation, but in the former process the iron values are lost and both processes are expensive and productive of low yields of $TiO_2$.

The present invention eliminates the above drawbacks by providing a radically new process wherein the ilmenite raw material, such as a concentrate from solid rock ilmenite, or beach sand ilmenite, of low gangue content, is pre-reduced by solid state reduction carried to substantially complete metallization of the iron content, and the reduced product without grinding subjected to magnetic separation to separate the reduced ilmenite product from gangue materials and other non-magnetic contaminants present in the reduction product, such as ashes, excess coke, CaO and CaS, and the magnetic fraction thence with additions of carbon but without additions of slagging agents, subjected to electric arc smelting at high temperature on the order of 1,600°–1,800°C, whereby molten iron and fluid titanium oxide slag of high purity and in high yields are obtained in separate layers, which may be separately tapped from the furnace and thus selectively recovered. The content of high purity titanium oxide in the slag obtained by the process, is about 75 to 100% $TiO_2$ equivalent, depending upon the titanium oxide and gangue contents of the starting material.

The novel process of this invention involving electric arc smelting at high temperature of substantially completely pre-reduced ilmenite, entails in addition to the above, various other major improvements, both as regards process and product, over the conventional direct smelting process, as will more fully appear from the following detailed disclosure.

The basic steps in the process are pre-reduction of an ilmenite ore or concentrate of low gangue content, to produce a high or substantially complete reduction of the iron oxide values with subsequent electric smelting at high temperature of the so reduced ilmenite. The feed material for the process is ilmenite containing about 45–65% $TiO_2$, either ilmenite concentrated from solid rock deposits, or beach sand ilmenite concentrates. Rock ilmenite concentrates generally contain about: 45–50 percent titanium oxide, 45–50 percent iron oxide and 5–10 percent gangue. The process flow may vary according to which feed material is chosen. For example, for a solid rock ilmenite concentrate containing about 45 percent $TiO_2$ and about 35% Fe as iron oxides, it is preferred to remove as much gangue as possible by conventional concentrating procedures before processing, as by fine grinding and flotation concentration. The residual gangue content should not exceed about 10 percent by weight and preferably not 5 percent for obtaining a high yield of titanium oxide. This requires that the concentrate be ground to a very fine particle size — minus 60 mesh (Tyler scale) — or even finer.

Such finely ground material must be pelletized before reduction with solid carbon or with reducing gases, and for purposes of electric arc smelting, as without such pelletizing such finely ground material would be blown out of the smelting furnace by the evolved gases. It has been found that pelletizing the feed material has other very important advantages in this process:

1. The pelletized material can be pre-reduced to practically any degree of reduction in a rotary kiln with carbon, because the pellets can stand higher reduction temperatures without melting than can the unpelletized material.
2. When thus pre-reduced and fed to the electric arc furnace, the electrical resistance is greater in pelletized material, which permits lower positioning of the electrodes, better heat penetration in the furnace, and greater heating of the charge.
3. Also it is easier to attain and maintain a sufficiently high metal temperature for tapping the lower carbon iron thus produced than that obtained in direct smelting.
4. In addition the furnace can be operated with less area of open bath, thus minimizing radiation to the roof of the furnace.

As above stated, the ilmenite concentrate should contain a minimum of gangue materials-less than 10 percent and preferably 5 percent or under by weight, because they, as above stated, will go through the process and end up in the titanium oxide slag, where they will contaminate the slag and reduce the $TiO_2$ equivalent content.

Pelletizing of the concentrated, finely ground ilmenite is carried out in the conventional manner by rolling "green" balls ¼–⅜ inch dia. in drums or discs. The type and amounts of balling or bonding additives and the amount of water to be added, etc., depend upon the individual ilmenite, particle size and distribution. About 0.5 percent bentonite and 9 percent water by weight of the total have been used successfully.

After balling, the green balls are fed to a heat hardening grate where the pellets are distributed on a moving grate in a layer which is heated by hot gases being pulled through the layer. The pellets are dried and calcined to sufficient strength. Besides, by regulating the air or oxygen intake, the sulfur content in the ilmenite pellets — about 0.2% S — is roasted and removed as $SO_2$ with the exhaust gases. This evaporation, heat hardening and roasting operation can be carried out either on a continuous grate, in a shaft, or in the so-called grate-kiln combination.

In the latter system, the hot, hard and desulfurized pellets are preferably fed directly into a rotary reduction kiln, preferably of the construction and mode of operation described in U.S. Pat. Nos. 2,829,042 and 3,170,786, O. Moklebust. An advantage of this system is that the roasted, indurated pellets can be fed hot to the kiln thus saving the usual cooling section of the heat hardening grate and the preheat section of the rotary reduction kiln. The exhaust gases from the rotary reduction kiln can be used for the hardening grate. With the kiln pre-heating section thus practically eliminated, the major part of the rotary kiln is used as a reduction zone and the high temperature profile thereof is extended correspondingly.

The reduction of the hot pellets is carried out as described in the above patents. Solid coke or coal — about minus 6 mesh — is added to the pellets. The ratio of carbon to pellets is in the range of 0.4:1 to 0.8:1 by weight, depending upon the size of the kiln, the iron content of the ilmenite, etc. In most cases, a ratio of 0.6:1 is used. Concurrently with the reduction process a low volatile hot char and hot combustible gases may be produced from coal and fed in the hot state of each directly into the reduction kiln in the manner described in U.S. Pat. No. 3,126,277, R.P. Smith, thus increasing the thermal efficiency of the reduction process.

If the temperature in the kiln is not too high, a small amount — say 5 percent — of limestone, lime or dolomite, is added in order to prevent any sulfur from the coke entering into the reduced iron. Sulfur will combine with CO to form COS which will react with CaO to CaS. In cases where a very high temperature is required in the reduction zone, the CaO and CaS may cause disturbing sintering. In such cases, the desulfurizing agent may be added to the hot kiln discharge.

The mixture of pellets and coke, coal or hot char, travels through the rotary kiln in counter current to the gases. Hot combustible gases as produced from the aforesaid charring operation or natural gas or gasified oil, are introduced from the discharge end and are gradually combusted together with the combustible gases emitted from the reduction in the kiln bed. Air or other free oxygen containing gases are introduced through air tubes along the kiln for gradual combustion, as needed, until complete combustion of all combustible gases is obtained.

The metallization can be regulated to any desired degree — up to practically complete reduction of about 95 percent or more of all the iron oxide in the ilmenite. For reasons explained later it is advantageous to reduce the iron oxide content of the pellets as much as practically possible.

The consumption of carbon in the rotary kiln corresponds to the amount used for the reaction $FeO + C \rightarrow Fe + CO$. This corresponds to about 0.08 ton of carbon or about 0.1 ton of coke or char per ton of ilmenite containing about 35 percent Fe. The consumption of natural gas if used, is about 3,000 cu.ft. per ton of ilmenite.

The hot discharge from the kiln, consisting of reduced pellets, a large excess of coke, lime, ashes, etc., may be cooled by discharge into an indirect rotary cooler as described in U.S. Pat. No. 2,986,460, D. E. Babcock, et al. After cooling the discharge is screened whereby the whole pellets of ¼–⅜ inch diameter are separated as oversize. The undersize consists of a large amount of excess coke, broken pellet fines, fine ashes and lime. This is magnetically separated to extract the reduced pellet fines which may then be combined with the whole, reduced pellets. The non-magnetic fraction is screened and air-separated for extraction of the coarser recycle coke from the finer ashes and lime.

The next step in the process is the electric arc smelting of the reduced pellets which is carried out without briquetting the pellets and in the absence of slag forming agents, but with sufficient additions of carbon to metallize the residual iron oxide present to the maximum extent, usually to the extent of complete reduction to Fe metal.

I have discovered in accordance with a novel feature of my invention that despite such drastic reduction of the iron oxide, the charge subjected to the electric arc may nevertheless be fused at relatively high temperatures of about 1,600°–1,800°C into a molten pool comprising separate layers of molten iron and a fluid slag containing about 75 to 100 percent by weight of $TiO_2$ equivalent, depending on the gangue content. Without being bound to any particular theory to account for this, I conclude from my investigations that the retained fluidity of the slag is due to conversion of a substantial fraction of the $TiO_2$ content to the lower oxide $Ti_2O_3$ produced by the drastic reduction of the residual iron oxide content produced by the carbon additions. This is a surprising phenomenon because it has been the general experience in the industry that in order to maintain a fluid slag the iron oxide content cannot be reduced below about 12 percent.

The smelting is preferably carried out in a three-phase electric arc furnace with continuous Soderberg self-baking electrodes. The difference between this type of smelting and direct smelting of unreduced ilmenite is that practically all reduction work has already been done in the rotary kiln. The electric furnace is now essentially a "melt-down" furnace and not a reduction furnace. Because of this, the electric power requirements are reduced considerably, to about one-half — with corresponding increase in furnace capacity. The electric power requirement for melting the reduced pellets is about 800KwH per metric ton of cold reduced pellet feed.

Another 200 KwH can be saved by feeding the electric furnace with hot feed. This can be done by eliminating the cooler after the reduction kiln and screening the kiln discharge in a hot state by means of water-cooled screens. Only the undersize would be cooled and recovered as by magnetic separation; whereas the hot oversize, reduced pellets would go to intermediate hot surge storage before feeding to the electric furnace.

Beside the savings in electric power and capacity, there are also some very important differences in quality of products — slag and iron. Starting with the same 45% $TiO_2$ feed ilmenite, the direct smelting method in the electric furnace will produce a slag with about 70-72% $TiO_2$ equivalent. The reason is that all the ashes from the reductant (coke), gangue and other contaminants, go into the slag by direct reduction; whereas in the process of this invention, the ashes, gangue and other non-magnetic contaminants are removed after pre-reduction giving a slag with about 75-98 % $TiO_2$ equivalent, depending on the gangue content. The fine flotation concentrates as employed in the present process, usally contain less gangue than the coarse ilmenites used in direct smelting.

Also in regard to the primary tapped iron there are differences. The iron tapped initially by direct smelting will contain more carbon — about 2 to 3 percent — and more sulfur — about 0.2 to 0.4 percent — than by the present method, wherein the iron contains about 1 percent or less of carbon, — usually about 0.3-0.5 percent—, and the sulfur is removed prior to electric furnace smelting as above explained. The present invention thus makes any subsequent refining easier, and more economical.

In order to successfully smelt pre-reduced ilmenite pellets in the electric furnace, it is important that the burden (reduced pellets plus additional carbon for the final reduction) has the correct electrical resistance. The resistance decreases as the content of the metallic iron increases in the reduced pellets. The resistance increases as the amount of carbon and the size of the pellets increase. As mentioned before, pelletizing is very important especially for reduced ilmenites with high iron contents of 30 percent or more.

For ilmenites with lower iron content, such as beach sand ilmenite concentrates containing, for instance 20-25% Fe, test results show that pelletizing can be eliminated before pre-reduction. These ilmenites can be reduced "as is" because they have less tendency to sintering in the rotary kiln due to their lower iron content. Also the reduced discharge from the rotary kiln can be screened and magnetically separated, thereby removing additional gangue and other non-magnetic contaminents from the reduced concentrates before electric smelting. Due to the relatively lower content of metallic iron and the particle size, which for beach sand ilmenite is about 35-150 mesh (Tyler scale), such reduced ilmenites have sffficient resistivity to be directly smelted successfully in an electric arc furnace as shown by the test results below.

The smelting of the reduced pellets or unpelletized material is a semi-continuous operation. In electric arc smelting the furnace is covered and preferably has three continuous electrodes extending through the roof, and several feed pipes for the pellets or unpelletized material. The bath surface is open between the electrodes. With low voltage (30 KV) and high resistivity, the furnace can be operated with a black top — however, the capacity of the furnace is then very low. With higher voltages (60 KV) the bath is more open between the electrodes with greater radiation losses to the roof. On the other hand, the efficiency is much higher.

After continuous feeding and ower input, the meltdown cycle is finished and slag and iron are present in separable fluid layers. Feeding is stopped about 10-15 minutes before the slag and iron are tapped and thereafter treated separately.

In the accompanying drawings, FIG. 1 is a flow sheet in diagrammatic form for the processing of solid rock ilmenite concentrate in accordance with this invention; while FIG. 2 is a similar flow sheet for the processing of beach sand ilmenite.

EXAMPLE I

FIG. 1 is a flowsheet for the reduction of a flotation concentrate of rock ilmenite obtained from the MacIntyre — Cheney Pond deposit located in upper New York State, U.S.A. Referring to FIG. 1, 300,000 tons of said ilmenite concentrate of 200 mesh, 46.5% $TiO_2$, 49.6 percent iron oxide as FeO and $Fe_2O_3$, and 3.9 percent gangue, were progressively fed from supply bin 10, and delivered as at 11, into a pelletizer 12, and formed into pellets of about ¼–⅜ inch. The pellets were discharged as at 13, onto a hardening grate 14, traversed as at 15, by the hot exit gases from a rotary reduction kiln 16, for thus indurating the pellets. The hardened, hot pellets were fed thence as at 17, into the feed end of the reduction kiln 16, in admixture with coke or hot char as at 18, and optionally also with limestone, as at 19. A mixture of natural gas or oil and air was injected into the discharge end of the kiln, as at 20, 21, and combusted therein for supplying the necessary heat for the reduction. Air was also injected at spaced points along the kiln for completing combustion of all combustible gases evolved in the reduction.

The hot discharge from the rotary kiln was delivered as at 22, into a cooler 23 of the type disclosed in the aforesaid U.S. Pat. No. 2,986,460, for cooling the same under non-oxidizing conditions to temperature below that of reoxidation, and the cooled product delivered thence as at 24, onto a screen 25, of a mesh to retain the whole pellets thereon, which are discharged thence, as at 26, into a surge bin 27. The undersize function thru screen 25, was delivered as at 28, to a magnetic separator 29, the magnetic fraction from which was delivered as at 30 to the surge bin 27. The reduced pelletized product delivered to surge bin 27 analyzed as follows by weight of the total: 95 percent total titanium oxide calculated as $TiO_2$, 44.1% $TiO_2$, 7.1% $Ti_2O_3$, 10.8% FeO, 33.6% Fe and 4.4% gangue.

From the surge bin the reduced pelletized product was delivered as at 31, into an electric arc furnace 32, wherein it is smelted into a pool at about 1,600°-1,800°C of molten iron and a superposed layer of fluid titanium oxide slag. The molten iron was tapped off periodically and delivered as at 33, to a refining stage 34, and cast thence into pigs or alternately granulated, and delivered thence as at 35, into bin 36. The total metallic iron produced was 105,000 tons. Meantime the slag was tapped off periodically and delivered as at 37 to a casting or granulating stage 38, from whence the slag was delivered as at 39 to a bin 40.

The total slag produced was 139,000 tons. The slag analysis was as follows in percentage by weight of the total: 95 percent total titanium oxide calculated as $TiO_2$, 47.5% $TiO_2$, 42.8% $Ti_2O_3$, 1.5% Fe and 8.2% gangue.

Reverting to the magnetic separation stage, the non-magnetic fraction from separator 29 was delivered as at 41, to an air separation and screening stage 42, for separation and recovery of the unconsumed coke which was recycled, as at 43 to the rotary kiln feed where it is supplemented as required with fresh coke from bin 44 supplied to the kiln input as at 45. The residue from separation stage 42 comprising ashes, CaO and CaS is discharged to waste, as at 46.

The hot discharge from the reduction kiln may alternatively by-pass the cooler 23, and be delivered as at 22a, onto a water cooled screen for discharge of the hot pellets retained on the screen into a hot surge bin and delivered thence in the hot state into the electric smelting furnace 32. In such case the fraction passing through screen 25 is cooled prior to magnetic separation, and the magnetic fraction therefrom delivered to the electric smelting furnace as at 30a.

EXAMPLE II

The flowsheet for this example was identical with that shown in FIG. 1. The material processed was a flotation concentrate of Tellnes ilmenite ore from Norway. The concentrate analysis by weight of the total was: 45% $TiO_2$, 46% $FeO + F_2O_3$ and 9 percent gangue. Referring to FIG. 1, 300,000 tons of the concentrate was pelletized, the pellets were indurated and thence subjected to solid state reduction as in FIG. 1. The reduced pellets were screened to separate the reduced whole pellets as oversize from the residue as undersize, which was subjected to magnetic separation to separate the magnetic fragmented pellets from the non-magnetic coke, ash, gangue, etc., as in FIG. 1.

The whole and fragmented pellets were charged into the surge bin as at 37, FIG. 1, and analyzed as follows: 42.5% $TiO_2$, 6.7% $Ti_2O_3$, 10.0% FeO, 30.8% Fe and 10.2 percent gangue.

From the surge bin the reduced material was charged into the electric smelting furnace as at 32 with added carbon to reduce residual iron oxide values to metallic Fe, and smelted into a molten pool at 1,600°-1,800°F of molten iron and fluid titanium oxide slag. The molten iron was tapped off periodically and further processed as in FIG. 1.

The fluid slag was likewise tapped off periodically subjected to reoxidation. The reoxidized slag was of the following analysis: 75 percent total titanium oxides calculated as $TIO_2$, 62.8% $TiO_2$, 11% $Ti_2O_3$, 7.6% FeO, 1.8% Fe and 16.8 percent gangue.

EXAMPLE III

The material processed in this example was an Indian-Quilon Beach San ilmenite concentrate from India of the following analysis: 59.2% $TiO_2$, 35.2% $FeO + Fe_2O_3$ and 5.6 percent gangue. Beach sand ilmenite is classified by nature as regards particle size with practically all grains between 20 and 150 mesh (Tyler) or about 0.016-0.004 inch (0.1-0.8 mm).

This material was processed in accordance with the FIG. 2 flowsheet, referring to which 220,000 tons of the material were progressively fed from a bin 50, and as at 51, into a rotary reduction kiln 52 in admixture with coke as at 53. A mixture of air and fuel was injected into the opposite end of the kiln as at 54, and burned therein to provide the requisite heat for the reduction. The kiln was of the construction and operation of the aforesaid U.S. Pat. No. 2,829,042 provided with air tubes disposed at spaced points therealong for injecting supplemental air for progressive and finally complete combustion of combustible gases, and for maintaining the correct temperature profile throughout the kiln for most efficient reduction as described in said patent.

To the hot kiln discharge there was added about 5 percent lime to desulphurize the ilmenite. The discharge was fed as at 55, into a cooler 56 of the construction above referred to. The cooled product was delivered as at 57 onto a 20 mesh screen 58, for removal of the coarser coke which was delivered as at 59, to an air separation stage 60, for removal of ash content, and the latter delivered to waste as at 61. The coke was recycled as at 62 to the kiln input as at 53 along with fresh make up coke from bin 63, delivered as at 64 to the kiln feed. The undersize through screen 58 consisted of reduced ilmenite, some coke, fine ashes, and gangue. It was delivered as at 65 to a magnetic separator 66, and the non-magnetic fraction (coke, ash and gangue), delivered to waste as at 67. The magnetic fraction was delivered as at 67 into a surge bin 68 and was found to be of the following analysis: 68 percent titanium oxides calculated as $TiO_2$, 57.8% $TiO_2$, 9.2% $Ti_2O_3$, 28.6% Fe + FeO and 4.4 percent gangue.

From bin 68 the reduced product was fed as at 69, into an electric arc smelting furnace 70, of the construction above described, together with a small amount of carbon, as at 71, for reduction of more of the FeO content to metal. Due to the low content of iron and the particle size, the electrical resistivity of the burden was sufficiently high for good distribution of the heat in the furnace. The burden was smelted into a molten pool at about 1,600°-1,800°C comprising separate layers of molten iron and fluid slag. The iron was tapped fluid despite the low carbon content of about 0.3 percent.

The molten iron was tapped off periodically from the furnace as at 72, and delivered to a refining stage 73, from whence it was cast as at 74, into pigs or alternatively granulated, to yield 50,000 tons of metallic iron, delivered into a bin 75.

The slag was likewise periodically tapped from the electric furnace and delivered as at 76 to a casting or granulating stage 77, and delivered thence as at 78, into a bin 79, to yield a total of 125,000 tons of slag of the following analysis: 97% $TiO_2$ equivalent comprising 48.5% $TiO_2$ and 43.5% $Ti_2O_3$, 1.5% Fe and 6.3 percent gangue.

If a sulfuric acid-soluble $TiO_2$ is desired, the original ilmenite is pelletized and processed as in FIG. 1 with the addition of about 5 percent of a sodium salt, such as soda ash, which reacts with carbon to form $Na_2O$, during the rotary kiln reduction. After tapping the slag should be oxidized at low temperature below about 400°C to convert $Ti_2O_3$ values present into $TiO_2$. The presence in the slag of about 2-3% $Na_2O$ imparts good solubility to the $TiO_2$ in sulphuric acid.

EXAMPLE IV

The feed ilmenite for this example was a beach sand ilmenite from Florida, U.S.A. This ilmenite contained about 64% $TiO_2$, 5% FeO, 27% $Fe_2O_3$ and 4 percent gangue. Its grain size was between 20 mesh and 150 mesh with only a few percent finer than 150 mesh. This ilmenite was mixed with fine coke breeze minus 6 mesh — about 1 ton of ilmenite and 0.6 ton of fine coke plus 2 percent of fine dolomite for desulfurizaation. The mixture was fed to a rotary reduction kiln and reduced as above described. The reduction temperature in the reduction section of the kiln was about 1,100°C. About 75–80 percent of the iron-oxides contained in the ilmenite was reduced to metallic iron in the kiln. The hot kiln discharge was cooled in absence of air to avoid reoxidation of the iron. The cooled kiln discharge consisted of metallized ilmenite, excess coke, liberated non-magnetic gangue material and fine calcined dolomite, which had been used for desulfurization. The kiln discharge was then screened to remove the coarser excess coke which was recycled to the kiln feed end. The undersize was then magnetically separated to extract the magnetic, metallized ilmenite from the liberated gangue in the ilmenite and from the dolomite and some fine coke. The latter fraction was put to waste although it could have been recovered by air separation if economically warranted. Due to the magnetic separation step more non-magnetic gangue was removed from the reduced ilmenite. Thus, the magnetic concentrate contained 70% $TiO_2$ equivalent, 18% Fe, as metal, and 7% Fe as FeO. The total gangue content ($SiO_2$, $Al_2O_3$, $ZrO_2$, etc.) in the reduced ilmenite was 3.5 percent. The sulfur content was low 0.01 percent, due to the addition of dolomite which prevented sulfur pick-up from the coke in the kiln.

The next step in the process was electric smelting. The metallized ilmenite was fed in the particle size as magnetically separated, to a single electrode arc furnace having a continuous Soderberg electrode. The furnace had a closed top and had a rating of 200 kVA and was operated about 150 kVA. The reduced ilmenite was fed to the furnace at a rate of 175 lbs. per hour. The furnace was tapped every 1½ hr. In the beginning no coke was added. However, the first taps made at about 1,650°C, showed only 86% $TiO_2$ and 15% FeO in the slag. Coke was added gradually until about 10 kgs per charge. The voltage was 29 volts in the beginning but was raised gradually to 50 volts. The temperature of the tapped slag was also raised from about 1,650°C to 1,750°C. Gradually the $TiO_2$ content of the slag increased to 90–95 and finally to about 98 to 100% $TiO_2$ (including 50% $Ti_2O_3$), at tapping temperatures of about 1,775°–1,800°C, and the iron content of the slags decreased from about 12 to 1.5% Fe. In spite of this the fluidity of the slag and iron and the tapping conditions were excellent. The final slags made are excellent feed material for production of $TiCl_4$.

The following Table I gives the average slag analysis for total titanium oxides calculated as $TiO_2$, and for iron oxide FeO for at least five taps made within each of the tapping temperature ranges shown.

TABLE I

| TAPPING TEMP. °C | AVG. SLAG ANALYSIS $TiO_2$% | FeO% |
|---|---|---|
| 1650–1680 | 85.0 | 12.7 |
| 1680–1710 | 87.0 | 10.2 |
| 1710–1730 | 89.2 | 10.9 |
| 1730–1760 | 93.5 | 5.05 |
| 1760–1770 | 96.0 | 2.94 |
| 1770–1780 | 97.5 | 3.16 |
| 1780–1810 | 98.6 | 3.6 |

It will be seen from this data that as the tapping temperature is progressively increased, the average $TiO_2$ content also progressively increases while the FeO content progressively decreases.

The following Table II gives the complete slag and metal analysis for the average of 10 to 12 taps each period and for the average tapping temperature shown therein taken thruout the entire electric furnace smelting period.

From Table II it will again be seen that the titanium oxide yield of the slag increases with the tapping temperature, while the iron oxide content decreases.

TABLE II.—PERIOD ANALYSES OF SLAG AND METAL

Slag.—Average of 10-12 Taps

| Period | Percent $TiO_2$ eq. | Percent $Ti_2O_3$ | Percent FeO | Percent $Al_2O_3$ | Percent $SiO_2$ | Percent MgO | Percent CaO | Percent MnO | Average temp., °C. |
|---|---|---|---|---|---|---|---|---|---|
| 1 | 88.2 | 36.2 | 13.8 | 1.5 | 1.52 | 1.02 | 0.39 | 1.46 | 1,710 |
| 2 | 87.8 | 34.3 | 13.4 | 3.0 | 1.25 | 1.52 | 0.45 | 1.50 | 1,705 |
| 3 | 95.4 | 43.7 | 6.3 | 1.3 | 1.87 | 0.85 | 0.34 | 1.37 | 1,765 |
| 4 | 98.4 | 50.6 | 3.7 | 1.9 | 1.35 | 0.83 | 0.28 | 1.33 | 1,760 |
| 5 | 98.6 | 52.6 | 3.7 | 2.4 | 0.57 | 0.84 | 0.34 | 1.29 | 1,775 |

Metal.—Average 10-21 Taps

| Period | Percent C | Percent Si | Percent Ti | Percent S | Percent P | Average temp., °C. |
|---|---|---|---|---|---|---|
| 1 | 1.00 | 0.14 | 0.02 | 0.11 | 0.35 | 1,710 |
| 2 | 0.40 | 0.02 | 0.03 | 0.13 | 0.26 | 1,705 |
| 3 | 0.84 | 0.34 | 0.11 | 0.11 | 0.30 | 1,765 |
| 4 | 1.12 | 0.72 | 0.05 | 0.08 | 0.28 | 1,760 |
| 5 | 1.14 | 0.98 | 0.05 | 0.09 | 0.29 | 1,775 |

What is claimed is:

1. Method for selectively recovering metallic iron and titanium oxide values in high yield from ilmenite ores and concentrate materials containing iron oxide which comprises: initially subjecting said material in particulate form to solid state reduction by heating in the presence of a reducing agent for iron oxide, and to temperature such as to reduce iron oxide of said material predominantly to the metallic state without sintering, separating the reduction product into magnetic and non-magnetic fractions, and then subjecting the magnetic fraction in the particulate form as separated to electrical arc smelting said smelting being carried out in the absence of slagging agent additions and with the addition of carbon sufficient to metallize residual iron oxide values in said magnetic fraction, said electric arc smelting being further characterized by fusing said magnetic fraction to a molten state by heating to a temperature above about 1730°C., thereby to metallize substantially all of the iron values in the molten material and reduce a substantial portion of the titanium values to trivalent titanium, said molten material comprising separate layers of molten iron and a fluid slag, said fluid slag comprising at least about 93.5 percent total titanium dioxide of which at least 43.7 percent comprises trivalent titanium and not more than about 6.05% FeO, and separating said molten iron and fluid slag layers.

2. Method for selectively recovering titanium oxide and metallic iron in high yields from ilmenite containing material containing iron oxide and about 40 to 65 percent by weight of titanium oxide, which comprises: subjecting an admixture of said material and a solid carbonaceous reductant to solid state reduction at elevated temperature below sintering such as predominantly to metallize the iron oxide content of said material, separating the magnetic from the non-magnetic fractions of the reduction product, subjecting the magnetic fraction with carbon addition sufficient to metallize the iron oxide in said magnetic fraction, and fusing said magnetic fraction to a molten state by electric arc heating to a temperature in the range from about 1,730 to as high as 1810°C., thereby to metallize substantially all of the iron values in the molten fraction and reduce a substantial portion of the titanium values to trivalent titanium, said molten fraction comprising separate layers of molten iron and a fluid slag, said fluid slag comprising from about 93.5 to about 98.6 percent total titanium dioxide of which from about 43.7 to 52.6 percent comprises trivalent titanium and not more than about 6.3 percent FeO, and separating said molten iron from said fluid slag.

3. Method for selectively recovering metallic iron and titanium oxide values in high yields from rock ilmenite ore which comprises: comminuting said ore to sufficient degree of fineness for separating gangue particles from iron oxide and ilmenite containing particles and effecting such separation non-magnetically to the extent that the ilmenite containing fraction contains at least 45 percent by weight of titanium oxide and not more than about 10 percent by weight of gangue, pelletizing said fraction, indurating said pellets by heat treatment, admixing said pellets with a solid carbonaceous reductant and subjecting said admixture to solid state reduction at temperature below sintering and such as predominantly to metallize the iron content thereof, separating the pelletized fraction from the residue of the reduced product, subjecting the pelletized fraction in the particle sizes as separated, to electrical arc smelting with addition of carbon sufficient to metallize the iron oxide in said magnetic fraction and fusing said magnetic fraction to a molten state by electric arc heating to a temperature in the range from about 1,730° to as high as 1,810°C., thereby to metallize substantially all of the iron values in the molten fraction and reduce a substantial portion of the titanium values to trivalent titanium, said molten fraction comprising separate layers of molten iron and a fluid slag, said fluid slag comprising from about 93.5 to about 98.6 percent total titanium dioxide of which from about 43.7 to 52.6 percent comprises trivalent titanium and not more than about 6.3 percent FeO, and separating said molten iron from said fluid slag.

4. Method for selectively recovering metallic iron and titanium oxide in high yields from ilmenite ores and concentrate materials having a particle size of about 0.1 to 1 mm and containing iron oxide and a titanium content of about 45 to 65 percent, which comprises: admixing said material with a solid carbonaceous reductant and subjecting to solid state reduction at elevated temperature below sintering and such as predominantly to metallize the iron content of said material, separating the magnetic from the non-magnetic fraction of the reduction production, subjecting the magnetic fraction in the particle sizes as separated to electric arc smelting with carbon additions sufficient to metallize the iron content in said magnetic fraction, and fusing said magnetic fraction to a molten state by electric arc heating to a temperature in the range from about 1,730° to as high as 1,810°C., thereby to metallize substantially all of the iron values in the molten fraction and reduce a substantial portion of the titanium values to trivalent titanium, said molten fraction comprising separate layers of molten iron and a fluid slag, said slag comprising from about 93.5 percent to about 98.6 percent total titanium dioxide of which from about 43.7 percent to about 52.6 percent comprises trivalent titanium and not more than about 6.3% FeO, and separating said molten iron from said fluid slag.

5. Method for selectively recovering metallic iron and titanium oxide in high yields from ilmenite ore of high gangue content, which comprises: preparing a comminuted concentrate of said ore containing iron oxide and ilmenite and not more than about 10 percent by weight of gangue, pelletizing said concentrate, indurating said pellets and admixing with a solid carbonaceous reductant of substantially smaller particle size and subjecting to solid state reduction at elevated temperature below sintering such as predominantly to metallize the iron content of said pellets, separating the reduced pelletized fraction from the residue, subjecting the pelletized fraction in the particulate form separated to electric arc smelting in the absence of slagging agent additions but with carbon additions sufficient to metallize the iron oxide content in said magnetic fraction, and fusing said magnetic fraction to a molten state by electric arc heating to a temperature in the range from about 1,730° to as high as 1,810°C., thereby to metallize substantially all of the iron values in the molten fraction and reduce a substantial portion of the titanium values to trivalent titanium, said molten fraction comprising separate layers of molten iron and a fluid slag, said fluid slag comprising about 93.5 percent to about 98.6 percent total titanium dioxide of which from about 43.7 percent to about 52.6 percent comprises trivalent titanium and not more than about 6.3% FeO, and separately recovering said iron and slag layers.

6. Method for selectively recovering metallic iron and titanium oxide values in high yields from ilmenite containing raw material which comprises: preparing a concentrate of said material containing iron oxide and a minimum titanium oxide content of about 45 percent by weight; subjecting sid concentrate to solid state reduction by heating the presence of a reducing agent for iron oxide and to temperature such as to reduce iron values to the metallic state without sintering; separting the magnetic iron and titanium containing fraction from the non-magnetic gangue and other impurities containing fraction of the reduced product; subjecting said magnetic fraction in the condition as separated and in a bed thereof of substantial depth, to electrical arc smelting by passage of current thru said bed in the absence of slagging agents and in the presence of carbon sufficient to metallize residual iron oxide values in said magnetic fraction, and fusing said magnetic fraction to a molten state by electric arc heating to a temperature in the range from about 1,730° to as high as 1,810°C., thereby to metallize substantially all of the iron values in the molten fraction and reduce a substantial portion of the titanium values to trivalent titanium, said molten fraction comprising separate layers of molten iron and a fluid slag, said fluid slag comprising from about 93.5 to 98.6 percent total titanium dioxide of which from about 43.7 to about 52.6 percent comprises trivalent titanium and not more than about 6.3% FeO, and separately recovering said iron and slag layers.

7. Method for selectively recovering metallic iron and titanium oxide values in high yields from ilmenite containing raw material, which comprises; preparing a concentrate of said mateiral containing iron oxide and a minimum of about 45 percent titanium oxide and a gangue content of not more than about 10 percent by weight of each; subjecting said concentrate to solid state reduction by heating in the presence of a reducing agent for iron oxide, to temperature such as to reduce iron values to the metallic state without fusion, separting the magnetic iron and titanium containing fraction from the non-magnetic gangue and otherimpurities containing fraction of the reduced product, subjecting said magnetic fraction in the condition as separated and in a bed thereof of substantial thickness, to electrical smelting by passage of current thru said bed in the absence of slagging agents and in the presence of carbon sufficient to metallize residual iron oxide values in said magnetic fraction to a molten state by electric arc heating to a temperature in the range from about 1,730° to as high as 1,810° C., thereby to metallize substantially all of the iron values in the molten fraction and reduce a substantial portion of the titanium values to trivalent titanium, said molten fraction comprising separate layers of molten iron and a fluid slag, said fluid slag comprising from about 93.5 to about 98.6 percent total titanium dioxide of which from about 43.7 to about 52.6 percent comprises trivalent titanium and no more than about 6.3% FeO, and separately recovering said iron and slag layers.

8. Method for selectively recovering metallic iron and titanium oxide values in high yields from ilmenite containing raw material, which comprises: preparing a concentrate of said material containing iron oxide and about 45 to 65 percent of titanium oxide and a gangue content of not more than about 10 percent by weight of each and in a particle size of about 0.1 to 1 millimeters; subjecting said material to solid state reduction by heating in the presence of a reducing agent for iron oxide, to temperature such as to reduce iron values to the metallic state without sintering, separating the magnetic iron and titanium containing fraction from the non-magnetic gangue and other impurities containing fraction of the reduced product, subjecting said magnetic fraction in the particle sizes as separated and in a bed thereof of substantial thickness, to electrical arc smelting by passage of current thru said bed in the absence of slagging agents and in the presence of carbon sufficient to metallize residual iron oxide values in said magnetic fraction, and fusing said magnetic fraction to a molten state by electric arc heating to a temperature in the range from about 1,730° to as high as 1,810°C., thereby to metallize substantially all of the iron values in the molten fraction and reduce a substantial portion of the titanium values to trivalent titanium, said molten fraction comprising separate layers of molten iron and a fluid slag, said fluid slag comprising from about 93.5 to about 98.6 percent total titanium dioxide of which from about 43.7 to about 52.6 percent comprises trivalent titanium and not more than about 6.3% FeO, and separately recovering said iron and slag layers.

9. Method for selectively recovering metallic iron and titanium oxide values in high yields from ilmenite containing raw material which comprises: comminuting said material to a sufficient degree of fineness for separating gangue particles from iron oxide and ilmenite containing particles, and effecting such separation to the extent that the ilmenite containing fraction contains a minimum of about 45 percent by weight of titanium oxide and not more than about 10 percent by weight of gangue, pelletizing said fraction, indurating said pellets by heat treatment, admixing said pellets with a comminuted solid state reduction at temperature below sintering and such as predominantly to metallize the iron content thereof, separting the magnetic pelletized fraction from the non-magnetic fraction of the reduced product, subjecting said pelletized fraction in the particles sizes separated, to electrical arc smelting in the absence of slagging agent additions and with addition of carbon sufficient to metallize the iron oxide content in said magnetic fraction, and fusing said magnetic fraction to a molten state by electric arc heating to a temperature in the range from about 1,730° to as high as 1,810° C., thereby to metallize substantially all of the iron values in the molten fraction and reduce a substantial portion of the titanium values to trivalent titanium, said molten fraction comprising separate layers of molten iron and a fluid slag, said fluid slag comprising from about 93.5 to about 98.6 percent total titanium dioxide of which from about 43.7 to about 52.6 percent comprises trivalent titanium and no more than about 6.3% FeO, and separating said molten iron from said fluid slag.

* * * * *